United States Patent [19]

Huggins et al.

[11] Patent Number: 5,069,547

[45] Date of Patent: Dec. 3, 1991

[54] MULTITRACK MULTILEVEL SENSING SYSTEM WITH ERROR DETECTING

[75] Inventors: Raymond W. Huggins, Mercer Island; Charles R. Porter, Redmond, both of Wash.

[73] Assignee: The Boeing Company, Seattle, Wash.

[21] Appl. No.: 576,270

[22] Filed: Aug. 31, 1990

Related U.S. Application Data

[63] Continuation-in-part of Ser. No. 275,208, Nov. 23, 1988, Pat. No. 4,964,727.

[51] Int. Cl.$^5$ .......................... G01B 11/14; H01J 3/14
[52] U.S. Cl. .................................. 356/374; 356/373; 250/237 G; 33/707; 364/739
[58] Field of Search ................ 356/373, 374; 250/226, 250/237 G; 33/706, 707, 746; 364/739, 746, 561; 235/437, 430

[56] References Cited

U.S. PATENT DOCUMENTS

| | | | |
|---|---|---|---|
| 4,047,025 | 9/1977 | Lemelson | 250/237 G |
| 4,465,373 | 8/1984 | Tamaki et al. | 250/237 G |
| 4,598,266 | 7/1986 | Bernardson | 364/746 |
| 4,816,805 | 3/1989 | Vojir et al. | 364/746 |
| 4,999,489 | 3/1991 | Huggins | 250/226 |

Primary Examiner—Richard A. Rosenberger
Assistant Examiner—Hoa Pham
Attorney, Agent, or Firm—Christensen, O'Connor, Johnson & Kindness

[57] ABSTRACT

A sensor that comprises an encoder that includes three or more tracks extending along a sensing axis. Each track i has a modulus $m_i$, and a property that varies along the sensing axis such that the property can have one of $m_i$ distinguishable levels. The moduli $m_i$ of the tracks are all pairwise relatively prime. The tracks are formed such that a value is associated with each position along the sensing axis, the level of each track i at a given position being equal to the residue of the value at that position to modulus $m_i$. The detector detects the levels of the tracks at a detection position along the sensing axis, and produces output signals corresponding to such levels. The track with the largest modulus comprises a redundant track that provides error detection capability.

10 Claims, 5 Drawing Sheets

| ENCODED VALUE | DATA TRACKS | | REDUNDANT TRACK |
|---|---|---|---|
| | $m_1 = 2$ | $m_2 = 3$ | $m_3 = 5$ |
| 0 | 0 | 0 | 0 |
| 1 | 1 | 1 | 1 |
| 2 | 0 | 2 | 2 |
| 3 | 1 | 0 | 3 |
| 4 | 0 | 1 | 4 |
| 5 | 1 | 2 | 0 |

MULTITRACK MULTILEVEL SENSING SYSTEM WITH ERROR DETECTING

RELATED APPLICATIONS

This application is a continuation-in-part of U.S. patent application Ser. No. 07/275,208, filed Nov. 23, 1988 now U.S. Pat. No. 4,964,727.

FIELD OF THE INVENTION

The present invention relates to sensing systems, and in particular to a sensing system that operates by sensing the position of a multitrack encoder.

BACKGROUND OF THE INVENTION

A number of attempts have been made to design and fabricate high precision sensing systems. In one known type of system, an encoder is attached to a movable member, and the position of the member is determined by interrogating the encoder with an optical or electrical signal. The member may be one that rotates, in which case the encoder may comprise a disk that rotates with the member, or may be linearly movable, in which case the encoder moves linearly along with the member.

In an analog system, the encoder typically includes a track that has a continuously variable property, such as a continuously variable optical transmission or reflection coefficient, or a continuously variable electrical resistance. In one known optical arrangement, an optical signal is transmitted to the encoder by an optical fiber, passes through the variable density track, and is then transmitted back to a suitable detector by an optical fiber. The optical attenuation of the fiber-optic links is an unknown and variable factor that must be determined before the position of the encoder can be inferred solely from an end-to-end attenuation measurement.

In a so-called two-wavelength referenced system, the link attenuation is measured by transmitting two optical signals having different wavelengths, and by designing the sensor such that only one signal is attenuated as a function of the encoder position. Attempts have been made to fabricate systems of this type that are capable of high-precision. However, it has been found that the performance is limited by differential bending loss with wavelength in the optical fibers, and differential loss due to different mode structures caused by different signal launching conditions. The stability of two wavelength referenced systems is generally accepted to be about 1 percent.

In prior digital encoding systems, the encoder includes a number of parallel coded tracks, each of which represents a specific bit in a binary word. Each track comprises a series of elements or positions, each of which has a property that can assume one of two states, such as transmitting/nontransmitting or reflecting/nonreflecting in optical systems, or conducting/nonconducting or high voltage/low voltage in electrical systems. For each position of the digital encoder, the tracks will present a different combination of elements, and therefore a different binary word, to the detection system. The precision is limited only by the highest achievable element density of the least significant track. In an optical system, wavelength division multiplexing (WDM) may be used to interrogate each track with light in a different wavelength range. This arrangement permits optical signals to be coupled to and from the sensor along single fiber-optic cables.

SUMMARY OF THE INVENTION

The analog and WDM digital encoding systems discussed above represent the state-of-the-art, and unfortunately fall short of many performance requirements, particularly with respect to size and precision. The present invention provides a novel sensor in which both analog and digital techniques are employed, to produce a significant increase in accuracy for a given sensor size.

The sensor of the present invention generally comprises encoding means and detection means. The encoding means is typically connected to a movable member (e.g., a shaft) whose position is to be sensed, and includes a sensing axis and three or more tracks extending along the sensing axis. Each track i has a modulus $m_i$ and a property that varies along the sensing axis such that the property can have one of $m_i$ distinguishable levels. The moduli $m_i$ of the tracks are all pairwise relatively prime. The tracks are formed such that a value is associated with each position along the sensing axis of the encoder, the level of each track i at each position being equal to the residue of the value at that position to modulus $m_i$. The detection means includes means for detecting the levels of the tracks at a position along the sensing axis, and for producing output signals corresponding to such levels. In a preferred arrangement, the track with the largest modulus comprises a redundant track, while the remaining tracks comprise data tracks. The data tracks are used to encode the value, and the detection means includes error detection means for processing the output signals from all tracks to determine if an error has occurred.

DETAILED DESCRIPTION OF A PREFERRED EMBODIMENT

Figure 1:
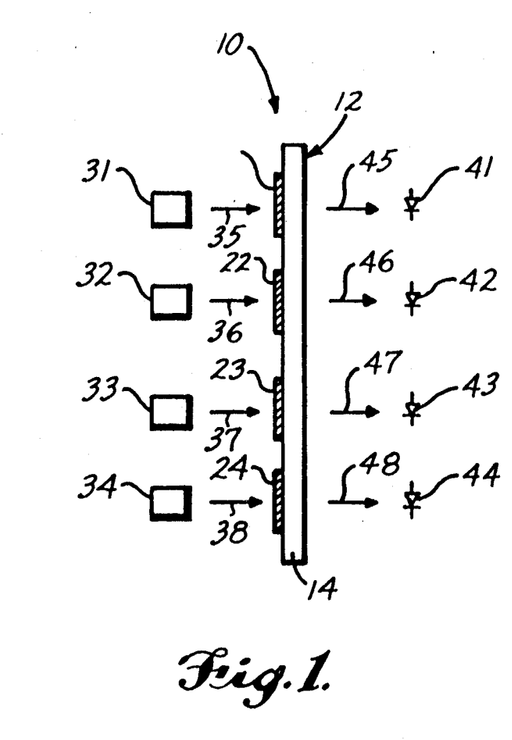
FIG. 1 is a schematic cross-sectional view of an encoder with tracks having variable transmissivity.
Figure 2:
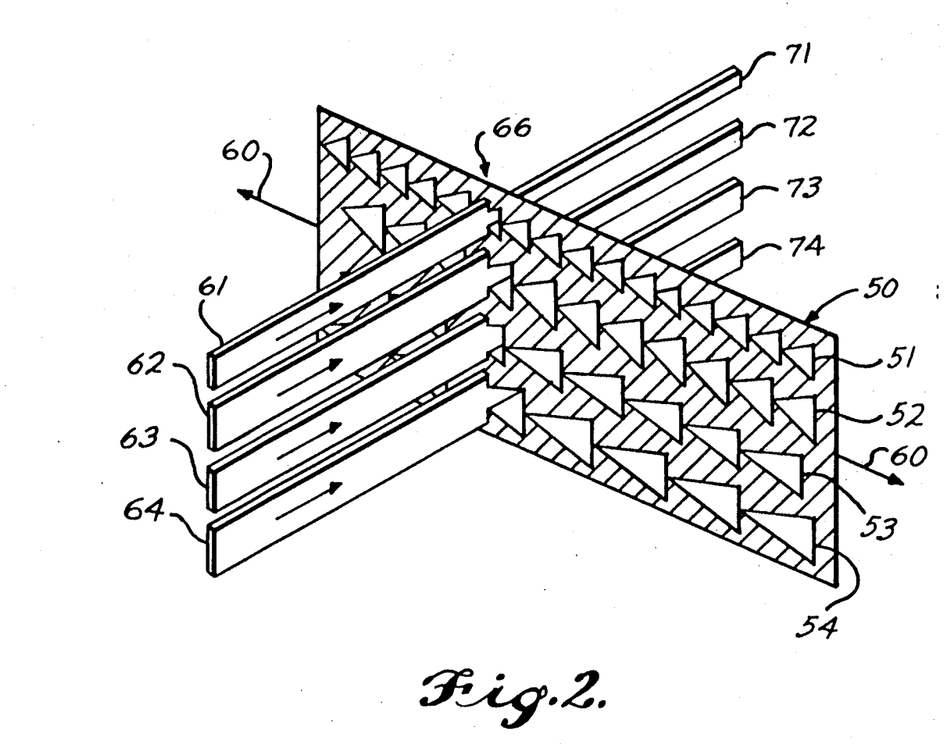
FIG. 2 is a schematic perspective view of an encoder with tracks having variable widths.

FIGS. 1 and 2 schematically illustrate encoding systems to which the present invention may be applied. Referring initially to FIG. 1, a sensor 10 is illustrated, the sensor comprising encoder 12 that includes substrate 14 and four tracks 21-24 formed on the substrate. Each track has an optical transmissivity that varies along a sensing axis normal to the plane of FIG. 1. The sensor also includes a detection system comprising optical emitters 31-34 and photodetectors 41-44. Emitters 31-34 produce optical input signals 35-38 that fall on tracks 21-24, respectively. The emitters can comprise LEDs, laser diodes, or any other suitable devices.

Each track modulates the intensity of its corresponding optical input signal, to produce a respective one of modulated signals 45-48 that fall on photodetectors 41-44 respectively. The photodetectors produce corresponding electrical output signals that encode the relative position of the encoder with respect to the detection system. Typically, encoder 12 is coupled to a movable member whose position is to be sensed, such that movement of the member causes the encoder to move along the sensing axis. More generally, the sensor can be constructed such that the encoder moves along the sensing axis in response to the variation of any arbitrary measurand.

FIG. 2 is a perspective view of a sensor similar to the one shown in FIG. 1, comprising encoder 50 that includes tracks 51-54 extending parallel to sensing axis 60. A transmissive system in shown in which encoder 50 is opaque, and the tracks comprise transparent or open areas that extend parallel to the sensing axis. The detection system produces input beams 61-64 that strike the encoder at detection position 66, and the sensor is arranged such that encoder 50 moves along sensing axis 60 relative to beams 61-64, in response to some variable. Each of beams 61-64 has a bar-shaped cross section that extends across the width dimension of its respective track. The amount of optical energy that passes through each track is therefore a function of the width of the track at the detection position. The widths, and therefore the total optical energies, of modulated beams 71-74 that emerge from the opposite side of encoder 50 therefore contain information which may be processed to determine the current relative position of the encoder with respect to the beams.

Although in FIGS. 1 and 2 the tracks and sensing axes are linear, rotational encoders can also be used in which the tracks and sensing axis are circular. In addition, sensors of the type shown in FIGS. 1 and 2 can use reflective rather than transmissive tracks. For example, in the FIG. 1 arrangement, a reflective system would be one in which tracks 21-24 had variable reflectivities, and in which photodetectors 41-44 were positioned on the same side of the encoder as the optical emitters. In the FIG. 2 arrangement, the variable width tracks could have reflective coatings, in which case the modulated beams would be produced by reflection from the tracks, and would again be formed on the same side of the encoder as the input beams.

Encoding systems constructed in accordance with the principles of the present invention utilize two or more data tracks, as in prior digital encoding systems, in combination with three or more levels (e.g., widths) per track, as in prior analog encoding systems. The number of levels of a track is referred to as the modulus of the track. The present invention uses different moduli for the different tracks, and selects the moduli such that one track performs an error-detecting function that is capable of detecting any single point error. This combination of digital and analog techniques produces a high accuracy encoding system that includes error detecting capability, while requiring only moderate analog stability compared to single track analog systems.

For purposes of comparison, a single, fixed modulus system will first be described. In a system that includes $d$ data tracks ($d > 1$), and in which the variable property of each track can take on $m$ different distinguishable levels $L_0$ through $L_{m-1}$ ($m > 2$), the maximum number of values that can be encoded is $m^d$. In such a system, all tracks have the same modulus $m$. Thus for the embodiment illustrated in FIG. 3 that includes three data tracks ($d = 3$), each track position having one of four different levels $L_0$, $L_1$, $L_2$ or $L_3$ ($m = 4$), values from zero through 63 may be encoded. As described in further detail below, a track may have a set of $m$ discrete levels, or a continuously variable level. In the latter case, the conversion of the continuously variable level into one of $m$ discrete levels may be effected by first converting the optical modulated signal into a corresponding continuously variable electrical signal, and then introducing the continuously variable electrical signal into a suitable level detection circuit.

Figure 3:
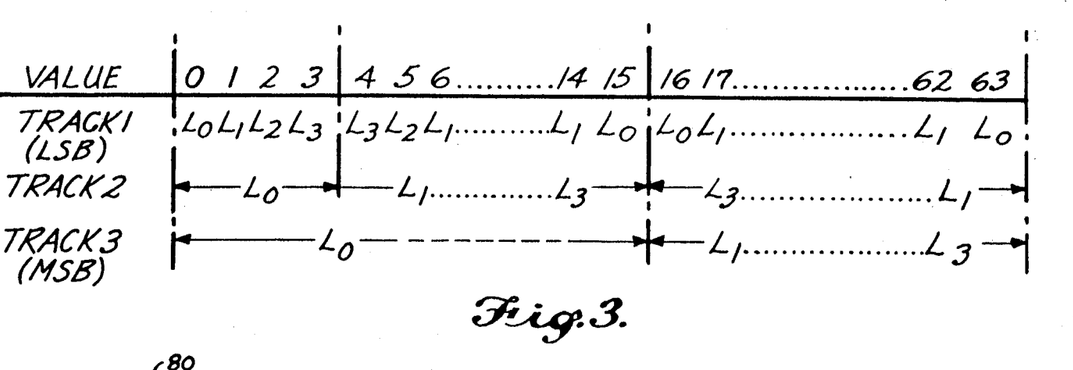
FIG. 3 illustrates a method of encoding a series of values with three tracks and four levels.

In the encoding technique shown in FIG. 3, track 1 is assumed to represent the least significant bit (LSB), and track 3 is assumed to represent the most significant bit (MSB). After a first track has run through its sequence of levels from $L_0$ through $L_3$, the next most significant track changes levels, and the first track then runs through the sequence in reverse order, from $L_3$ to $L_0$. Thus, the track 1 pattern is "reflected" about the transition between values 3 and 4, 7 and 8, etc., and the track 2 pattern is reflected about the transition between values 15 and 16, 31 and 32, etc. Tracks 1 and 2 can therefore be described as palindromic, i.e., they read the same in both the forward and reverse directions. This ensures that when a transition between levels occurs in a given track, all other tracks remain at the same level at that transition. In addition, for all tracks, all transitions are ±one level, to thereby minimize the possibility of reading an erroneous intermediate level at a transition.

In contrast to the fixed modulus system shown in FIG. 3, the present invention utilizes a mixed or variable modulus system, in which each track has a different modulus. In particular, the present invention uses two or more data tracks of differing moduli to encode particular values, and also utilizes an additional redundant track that serves to make the system capable of detecting when an error has occurred. The moduli of the data tracks and of the redundant track are selected such that the moduli are all pairwise relatively prime with respect to one another. The result is a system in which the presence of any single error can be detected.

The mixed modulus system of the present invention can be described by reference to residue arithmetic, as set forth for example in *Residue Arithmetic and Its Applications to Computer Technology*, Szabo & Tanaka, McGraw-Hill 1967. In a residue numbering system, the base consists of n integers $m_1, m_2 \ldots m_n$, where each integer $m_i$ is called a modulus. In this base, the residue representation of any integer X is another set of numbers (residues) $r_1, r_2, \ldots r_n$, where the residues $r_i$ are defined by the n equations:

$$X = q_i m_i + r_i \quad i = 1, 2, \ldots n \tag{1}$$

For each i, $q_i$ is an integer chosen such that $$0 \leq r_i < m_i \tag{2}$$

For example, in an $n = 3$ system in which $m_1 = 2$, $m_2 = 3$, and $m_3 = 5$, the number thirteen is represented by 113. In general, any integer X can be converted into a set of residues $r_1, r_2, \ldots r_n$ using equations 1 and 2, while a set of residues can be converted back into integer X using what is known as the Chinese remainder theorem, as set forth in further detail in the Szabo & Tanaka reference cited above.

Provided that the values of $m_i$ are all pairwise relatively prime, i.e., the greatest common divisor of any pair of moduli is 1, the number of values of X that can be represented unambiguously is M, where M is the least common multiple of the moduli, i.e., $$M = m_1 m_2 \ldots m_n \quad (3)$$

If a redundant modulus $m_r$ is added to the number base, such that $m_r$ is greater than $m_n$, and such that $m_r$ satisfies the pairwise relatively prime condition, the integer calculated from the residues $r_1, r_2, \ldots r_n, r_r$ must lie within the range between zero and M-1, assuming that negative numbers are not allowed. If negative numbers are allowed, the range becomes $-M/2$ to $M/2-1$. Thus if the conversion from a group of residues gives a number outside of the appropriate range, an error has occurred.

Figure 4:
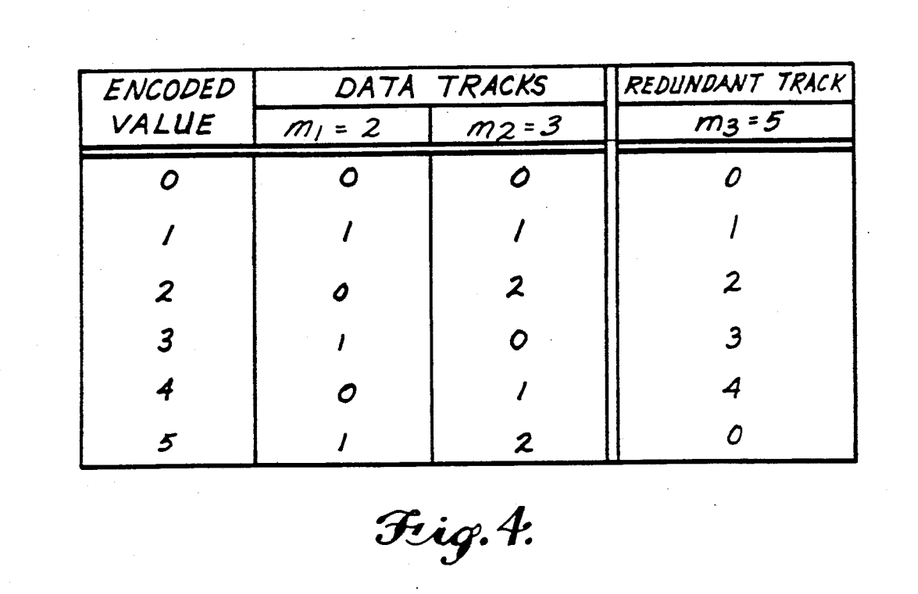
FIG. 4 is a table illustrating the residue encoding system of the present invention.

Operation of the encoding system of the present invention can be understood by reference to the simple example illustrated in FIG. 4. Column 1 of FIG. 4 represents six values to be encoded, from 0 to 5. Using two data tracks with moduli of 2 and 3, these values would be encoded as shown in the second and third columns of FIG. 4, i.e., as the residues 00, 11, 02, 10, 01 and 12. Although each value is represented by a unique pair of residues, a single error in either one of the tracks cannot be detected, because such an error would change a valid value into another valid value. For example, a single error in the modulus 3 track could change the representation of zero (00) into four (01), while a single error in the modulus 2 track could change the value zero (00) into three (10).

The last column in FIG. 4 represents a redundant track having a modulus 5 that satisfies the pairwise relatively prime condition described above. The values 0 through 5 are now represented by the residues 000, 111, 022, 103, 014, and 120. It can readily be verified that an error in reading a single track for any of values 0-5 cannot change the residues into a valid representation of another value. Thus, detection of a residue combination not shown in FIG. 4 unambiguously indicates that an error has occurred. For example, imagine that at a position on the encoder at which the value one was encoded (residues 111), an error in the modulus 3 track changed the residues to 121. Error detection could be performed either by determining that the residues 121 were not included in a look-up table, such as the table shown in FIG. 4, or by converting residues 121 back into the corresponding integer. In this example, the back conversion would produce the value eleven, and the fact that this value is outside of the range 0-5 indicates that an error has occurred.

Figure 5:
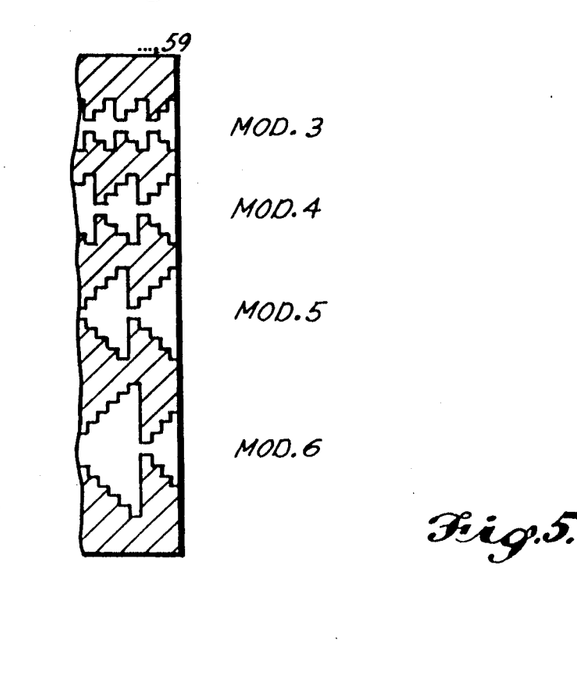
FIG. 5 illustrates an encoder according to the present invention.
Figure 6:
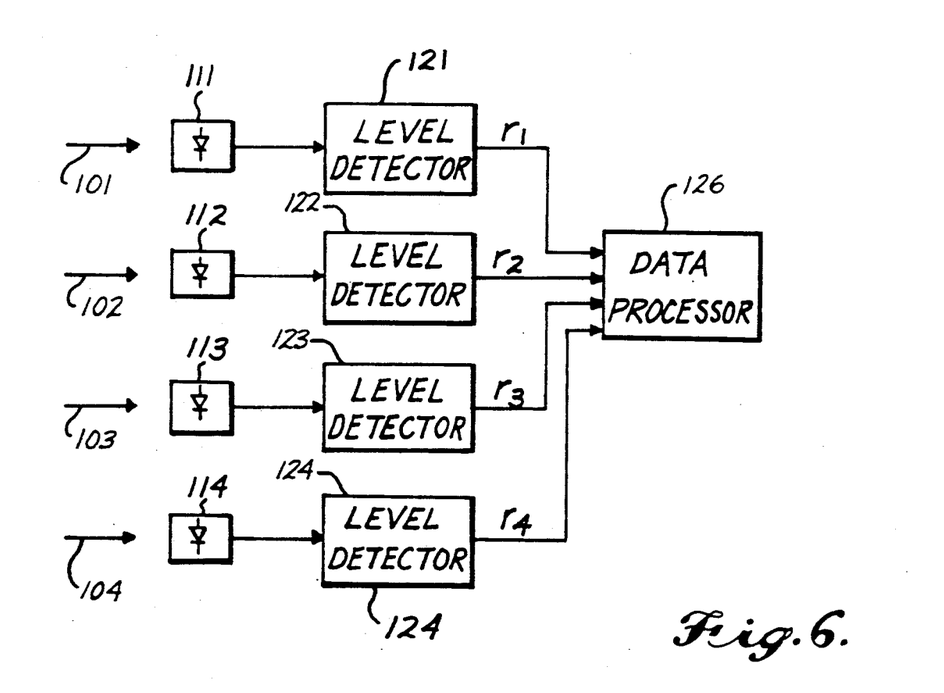
FIG. 6 is a block diagram of a detection system that may be used with the encoder of FIG. 5.

FIGS. 5 and 6 illustrate a particular preferred embodiment of the invention for a three data track, optical transmission system, generally similar to the system shown in FIG. 2. In particular, FIG. 5 illustrates encoder 80 having three data tracks 81-83, and redundant track 84. Data tracks 81-83 have moduli of 3, 4, and 5, respectively, while redundant track 84 has modulus 7. The maximum number of values that can be encoded by the data tracks is $3 \cdot 4 \cdot 5 = 60$, and the encoded values 0-59 are partially indicated along the top of encoder 80. FIG. 5 also illustrates the profiles 91-94 of the input beams for tracks 81-84, respectively.

Referring now to FIG. 6, the modulated optical signals 101-104 transmitted through tracks 81-84 are input into photodetectors 111-114, respectively. The photodetectors produce corresponding electrical signals that are input to level detectors 121-124, respectively. Level detector 121 encodes the output signal from photodetector 111 modulus 3, i.e., it assigns the output signal to one of three possible levels, depending upon the optical energy incident on the photodetector. These three levels correspond to the three widths shown for track 81 in FIG. 5. Level detectors 122-124 similarly encode their respective photodetector output signals to moduli 4, 5, and 7, respectively. Thus the outputs of the level detectors are the residues $r_1-r_4$. These residues are then provided to data processor 126, and the data processor converts the residues into the corresponding encoded value X. In one preferred embodiment, the data processor includes a look up table of the form shown in FIG. 4, the look up table including the representations of the valid residue combinations. If the number $r_1 r_2 r_3 r_4$ is found in the look up table, then the corresponding encoded value is output. If the number $r_1 r_2 r_3 r_4$ is not in the table, then an error has occurred, and data processor 126 either ignores the reading, indicates that an error has occurred, or takes any other suitable action. In an alternative embodiment, the data processor uses the Chinese remainder theorem to convert the residues back into integer X. If the integer lies in the appropriate range (for example, 0 through 59), then the integer is output. Otherwise, the data processor either ignores the reading, indicates that an error has occurred, etc.

The illustration of FIG. 6 uses four photodetectors and four level detectors, one for each track of the encoder. However, it will be appreciated by those skilled in the art that a simplification of such circuitry is possible by means of time division multiplexing. In a time division multiplexed system, a single photodetector and level detector would be required, and the output of the level detector would correspond to different residues during different time slots.

Figure 7:
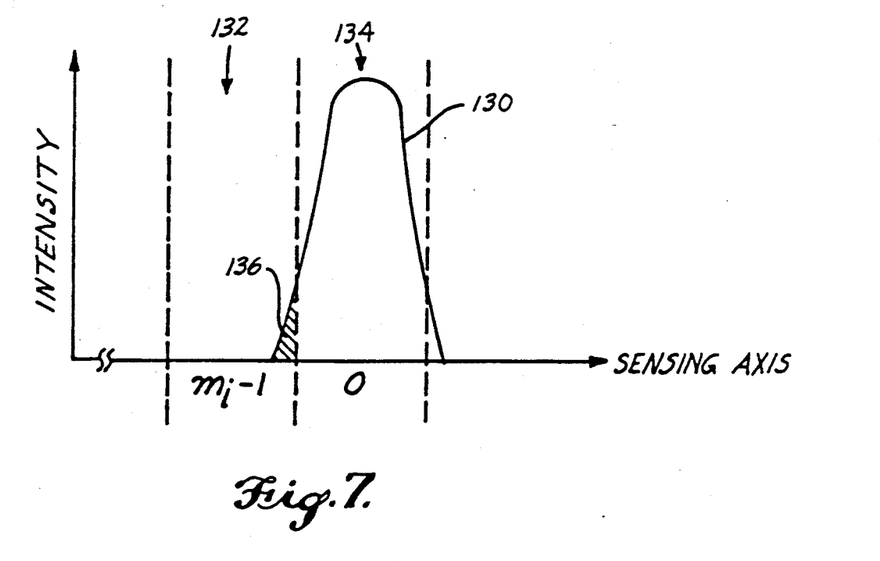
FIG. 7 is a graph illustrating leakage of light between adjacent track positions.

A limitation of the encoder illustrated in FIG. 5 is that each track periodically changes from its maximum width or transmissivity directly to its minimum width or transmissivity, without passing through intermediate levels. This leads to two, interrelated problems. First, when an encoder track is positioned (with respect to its input beam) such that the input beam strikes a position intermediate between the maximum and minimum width portions of the track, there is a significant possibility of reading an erroneous, intermediate level for that track. Further, the track arrangement shown in FIG. 5 puts stringent requirements on the widths of the input beams represented by profiles 91-94. For example, in FIG. 7, curve 130 represents the intensity of an input beam as a function of position along the sensing axis of the encoder. Position 132 represents the area along the sensing axis at which the track has a level one less than the modulus of the track ($m_i-1$), i.e., the position at which the track has a maximum width or transmissivity. Reference numeral 134 represents a position along the encoder track at which the level 0 is encoded, i.e., a minimum width or transmissivity position. In FIG. 7, the beam is positioned to read level 0 for the track. However, area 136 under curve 130 represents a portion of the input beam that is incident upon the track position where the track has a maximum width or transmissivity. Therefore, a relatively large fraction of light 136 passes through the track and strikes the photodetector. If curve 130 is too broad, then this leakage of light can be enough to cause an erroneous reading, i.e., the amount of light transmitted through the track at position 132 may exceed the threshold between levels of 0 and 1, and level 1 rather than 0 will be detected by the level detector.

A second problem with the encoder shown in FIG. 5 arises because the levels of at least two tracks, and frequently the levels of all tracks, change between every transition between adjacent positions or values. This results from the requirement for a redundant measurement. Unless the energies of all the transmitted optical beams equal the thresholds between adjacent positions or integer values simultaneously, an error will be indicated during each transition.

Figure 8:
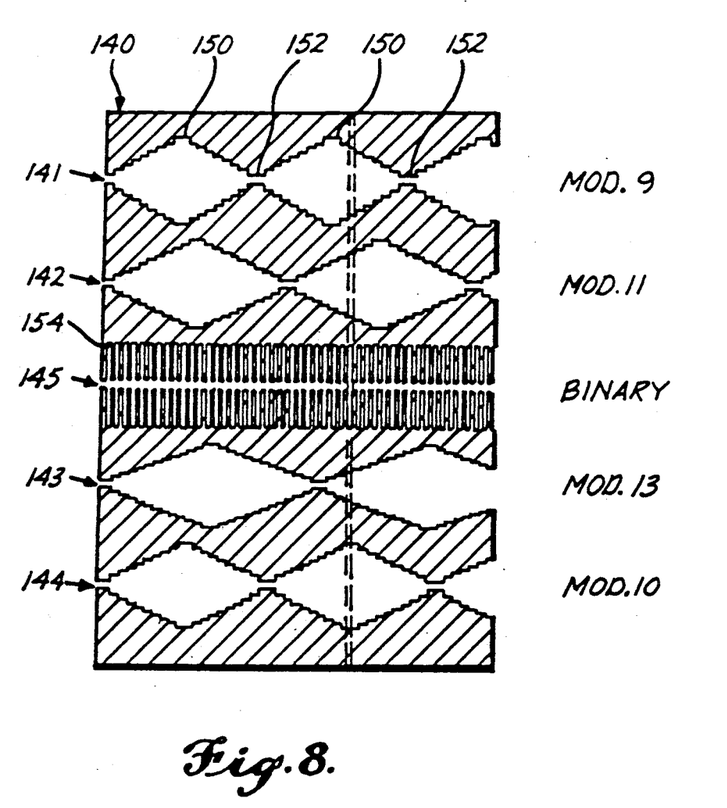
FIG. 8 illustrates an encoder that includes a binary track.

Both of the above-described problems are solved by encoder 140 partially shown in FIG. 8. Encoder 140 includes tracks 141-144 having moduli of 9, 11, 13, and 10, respectively. Tracks 141, 142, and 144 serve as the data tracks, while the highest modulus track 143 serves as the redundant track. This encoder is therefore capable of encoding 9·10·11 or 990 values. Each of tracks 141-144 is palindromic and has a shape that is "reflected" about the maximum and minimum width points of that track. For example, track 141 is reflected about its maximum width points 150 and its minimum width points 152. As a result, all transitions between adjacent levels along the track occur in steps of of $\pm 1$ levels, i.e., each residue only changes in steps of $\pm 1$. For palindromic arrangements, the residues no longer directly encode a sequential series of values, and a look up table must therefore be used to convert the track levels into a measurement of encoder position.

The second problem mentioned above, i.e., nonsimultaneous transitions of different tracks, is solved by the addition of a binary (i.e., two level) track 145. Track 145 consists of a series of high transmission (i.e., high width) regions 154, one for each encoded value. The outputs from tracks 141-144 are processed such that a valid output is only indicated when track 145 is at its high level. Thus binary track 145 in effect acts as a strobe. In practice, the binary track can also act as an intensity reference track, particularly in a system in which the sensor is located at a position remote from the optical sources and detectors. If a second binary track were to be added in quadrature with the first binary track, it would also be possible to accommodate very high slew rates, without resorting to parallel interrogation of the tracks.

An alternate technique for dealing with the problem of nonsimultaneous transitions of the tracks is to accept the fact that an error will be indicated at each transition, and apply a "reasonableness test" to the next error free value. An example of such a test might be one in which the old and new values cannot differ by more than an amount which depends upon the maximum slew rate of the system, and the time between samples.

In optical systems, tracks having three or more levels can be created in a number of ways. For example, in a transmission system, the energy of a modulated beam can be changed by varying the width of the track, as shown in FIG. 8, and/or by varying the optical density or transmissivity of the track, as in FIG. 1. Variable transmissivity can be created by means of a film having variable optical density, or by means of a pattern of opaque or transmissive elements in which the density or size of the elements varies. As already mentioned, level variation can either occur in discrete steps or continuously. In a track with a continuously varying level, the discrimination between discrete levels occurs in the level detection circuits, such as those illustrated in FIG. 6. As a result, increased resolution is possible, because the resolution is not limited by the width of the interrogating beams along the sensing axis. In a system that is operated by reflection rather than by transmission, the energy of the modulated beam can be varied by varying the width of a reflective track, or by varying the reflectivity of the track. Varying track reflectivity could be created by varying the density or size of reflective elements, as for the transmission case.

Figure 9A:
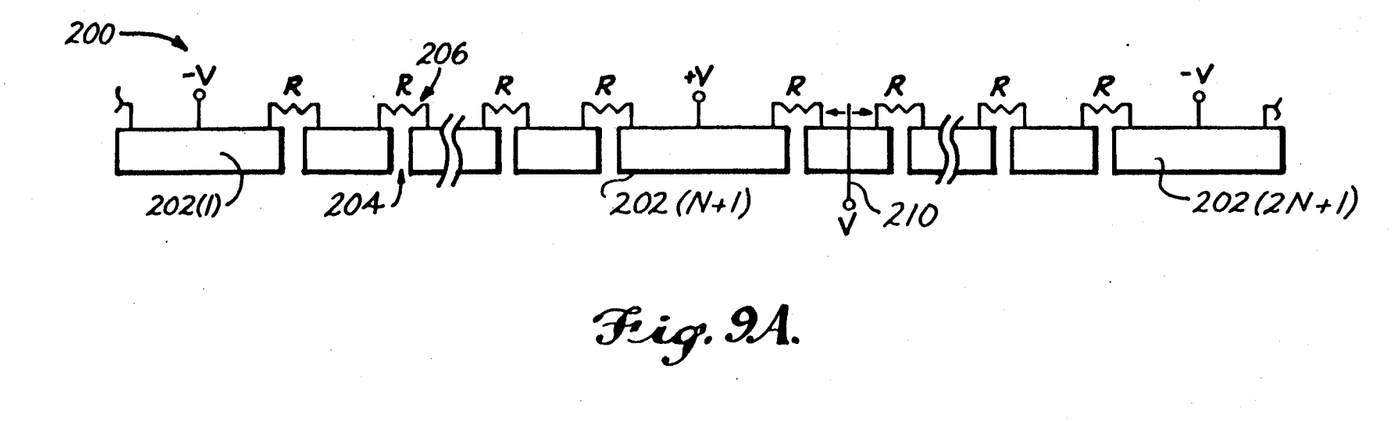
FIGS. 9A and 9B are schematic diagrams of stepwise and continuous electrical encoder tracks.
Figure 9B:
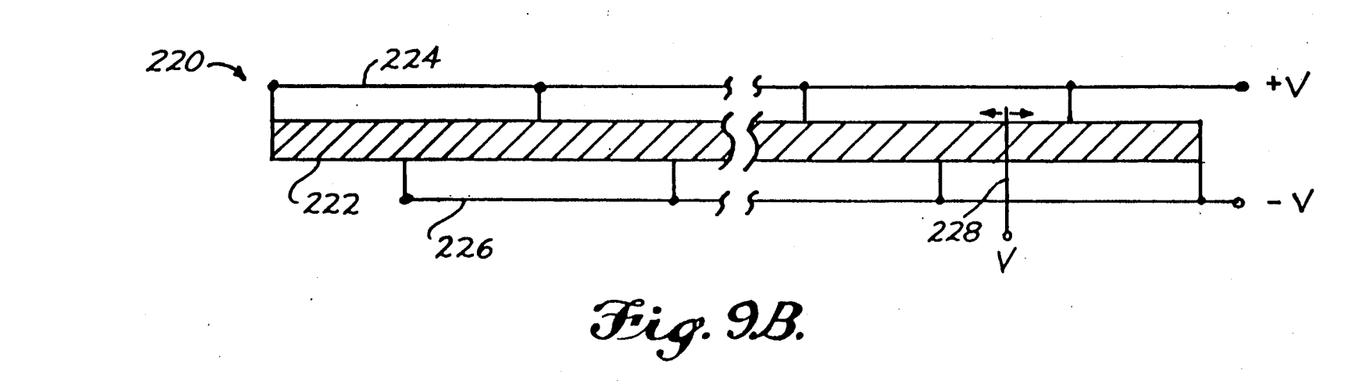

The principles of the present invention can be applied to both optical and nonoptical encoders. FIGS. 9A and 9B illustrate preferred embodiments of tracks in which the variable property is a voltage rather than transmissivity or reflectivity. Referring initially to FIG. 9A, encoder track 200 comprises a linear array of electrically conducting segments 202, separated from one another by narrow gaps 204. Adjacent segments are interconnected to one another by resistance means 206. In the illustrated embodiment, each resistance means has the same resistance R. Segment 202(1) is connected to negative potential $-V$, segment 202(N+1) is connected to a positive $+V$, segment 202(2N+1) is connected to a negative potential $-V$, etc. As a result, moving along the track, the potential varies in a stepwise manner between $-V$ and $+V$. The potential at any point along the track is sensed by a wiper 210 that moves lengthwise with respect to the track (or vice versa) as the measurand of interest varies. A palindromic arrangement is provided, as in FIG. 8, such that the voltage values are reflected about the minimum voltage segments, e.g., segments 202(1) and 202(2N+1), and about the maximum voltage segments, e.g., segment 202(N+1).

FIG. 9B illustrates a continuously variable track 220 comprising a continuous resistive strip 222. A first conductor 224 held at a potential of $+V$ is periodically coupled to strip 222, and a second conductor 226 held at a potential of $-V$ is connected to strip 222 at the same spatial frequency, but offset by half a cycle. As a result, the potential V sensed by wiper 228 varies continuously in a sawtooth pattern between $+V$ and $-V$ as the wiper moves relative to the track.

For encoders constructed in accordance with the present invention, the stability or precision of the analog measurement need only be better than 1/m, where m (the number of levels) will typically be between 4 and 20. A stability of one part in 20 (5%) is about 5 times easier to obtain than the accepted state of the art for optical fiber analog systems. Such performance can be achieved without going to an excessive degree of optical complexity, and without adopting overly complex signal processing methods. In addition, for tracks having levels that vary in stepwise fashion, the step sizes do not need to be constant. For example, a preferred approach is to make the relative step size, i.e., the step size divided by the width of the track at that point, substantially constant.

While the preferred embodiments of the invention have been illustrated and described, variations will be apparent to those skilled in the art. Accordingly, the invention is not limited to the described embodiments, but is instead set forth in the following claims.

The embodiments of the invention in which an exclusive property or privilege is claimed are defined as follows:

1. A sensor, comprising:

encoding means having a sensing axis and three or more tracks extending along the sensing axis;

each track i having a modulus ($m_i$) and a property that varies along the sensing axis such that the property can have one of $m_i$ distinguishable levels, the moduli $m_i$ all being pairwise relatively prime;

the tracks being formed such that a value is associated with each position along the sensing axis of the encoder, the level of each track i at a position being equal to the residue of the value associated with the position to modulus $m_i$; and detection means for detecting the levels of the tracks at a detection position along the sensing axis and for producing output signals corresponding to the levels.

2. The sensor of claim 1, wherein the track having the largest modulus comprises a redundant track and the remaining tracks comprise data tracks, and wherein the detection means comprises error detection means for processing the output signals from the data tracks and the redundant track to determine whether an error has occurred.

3. The sensor of claim 2, wherein the error detection means comprises means for comparing a set of levels for the tracks to a look-up table, to determine if said set is included in the table.

4. The sensor of claim 1, wherein for at least one track, the property has one of three or more distinct levels at each position along the track, and wherein at all transitions between first and second distinct levels, there are no other distinct levels between the first and second distinct levels.

5. The sensor of claim 4, wherein said at least one track is palindromic.

6. The sensor of claim 1, wherein for each track, the property has one of three or more distinct levels at each position along the track, and wherein at all transitions between first and second distinct levels, there are no other distinct levels for that track between the first and second distinct levels.

7. The sensor of claim 6, wherein each track is palindromic.

8. The sensor of claim 2, wherein the encoding means comprises an additional binary track extending along the sensing axis, the binary track having two levels, a first level at positions along the sensing axis at which the levels of the other tracks do not change, and a second level at positions along the sensing axis at which the levels of the other tracks change, and wherein the detection means comprises means for detecting whether the binary track is at the first or second level at the detection position, and means for processing the output signals to determine said value when the binary track is at the first level.

9. The sensor of claim 1, wherein the detection means comprises means for producing an optical input signal for each track and for directing the optical input signal onto the track at the detection position, and wherein each track includes means for modulating the optical input signal to produce a modulated signal, such that the optical energy of the modulated signal corresponds to the level at the detection position.

10. The sensor of claim 1, wherein the detection means comprises means for measuring the voltage of each track at the detection position.

* * * * *